(12) United States Patent
Mital et al.

(10) Patent No.: US 7,900,441 B2
(45) Date of Patent: Mar. 8, 2011

(54) PRECAT-NOX ADSORBER EXHAUST AFTERTREATMENT SYSTEM FOR INTERNAL COMBUSTION ENGINES

(75) Inventors: Rahul Mital, Rochester Hills, MI (US); Bradlee J. Stroia, Columbus, IN (US); Shyancherng C. Huang, Columbus, IN (US); Robert C. Yu, Columbus, IN (US)

(73) Assignee: Fleetguard, Inc., Nashville, TN (US)

( * ) Notice: Subject to any disclaimer, the term of this patent is extended or adjusted under 35 U.S.C. 154(b) by 636 days.

(21) Appl. No.: 10/778,651

(22) Filed: Feb. 12, 2004

(65) Prior Publication Data

US 2005/0178110 A1    Aug. 18, 2005

(51) Int. Cl.
*F01N 3/00* (2006.01)

(52) U.S. Cl. .......... 60/286; 60/274; 60/287; 60/292; 60/297; 60/301; 60/303

(58) Field of Classification Search .......... 60/274, 60/286, 287, 288, 291, 292, 295, 297, 301, 60/303, 324
See application file for complete search history.

(56) References Cited

U.S. PATENT DOCUMENTS

| | | | |
|---|---|---|---|
| 4,902,487 A | 2/1990 | Cooper et al. | |
| 5,195,319 A | 3/1993 | Stobbe | |
| 5,388,406 A * | 2/1995 | Takeshima et al. | 60/297 |
| 5,437,153 A * | 8/1995 | Takeshima et al. | 60/276 |
| 5,571,484 A | 11/1996 | Pettit et al. | |
| 5,660,800 A | 8/1997 | Mieville et al. | |
| 5,746,989 A | 5/1998 | Murachi et al. | |
| 5,776,423 A | 7/1998 | Feeley et al. | |
| 5,792,436 A | 8/1998 | Feeley et al. | |
| 6,003,303 A | 12/1999 | Peter-Hoblyn et al. | |
| 6,093,378 A | 7/2000 | Deeba et al. | |
| 6,105,365 A * | 8/2000 | Deeba et al. | 60/274 |
| 6,125,629 A * | 10/2000 | Patchett | 60/286 |
| 6,182,443 B1 | 2/2001 | Jarvis et al. | |
| 6,314,722 B1 | 11/2001 | Matros et al. | |
| 6,419,890 B1 | 7/2002 | Li | |
| 6,427,436 B1 | 8/2002 | Allansson et al. | |
| 6,708,486 B2 * | 3/2004 | Hirota et al. | 60/297 |
| 6,735,940 B2 * | 5/2004 | Stroia et al. | 60/286 |
| 6,779,339 B1 * | 8/2004 | Laroo et al. | 60/297 |
| 6,813,882 B2 * | 11/2004 | Hepburn et al. | 60/286 |
| 6,820,417 B2 * | 11/2004 | May et al. | 60/297 |
| 6,877,312 B2 * | 4/2005 | Nakatani et al. | 60/288 |
| 7,040,087 B2 * | 5/2006 | Nakatani et al. | 60/286 |
| 2001/0043896 A1 | 11/2001 | Domesle et al. | |
| 2002/0044897 A1 | 4/2002 | Kakwani et al. | |
| 2002/0053202 A1 | 5/2002 | Akama et al. | |
| 2002/0054843 A1 | 5/2002 | Maunula | |
| 2002/0155039 A1 | 10/2002 | Itoh et al. | |
| 2003/0072702 A1 | 4/2003 | Itoh et al. | |

* cited by examiner

*Primary Examiner* — Binh Q. Tran
(74) *Attorney, Agent, or Firm* — Krieg DeVault LLP; J. Bruce Schelkopf, Esq.

(57) ABSTRACT

The invention provides a NOx adsorber aftertreatment system for internal combustion engines which utilizes at least one precat operatively coupled to at least one NOx adsorber to aid in the regeneration of the NOx adsorber. Fuel is injected into a precat located upstream of a NOx absorber producing heat, $H_2O$, and reductants such as CO, HC, and volatile hydrocarbons, which are input into the NOx absorber. The combination of heat, water, and reductants help to efficiently regenerate the NOx Adsorber which in turn releases exhausts products such as $CO_2$ and $N_2$. Regeneration of a NOx adsorber can be performed during periods of reduced exhaust gas flow lowering the fuel penalty associated with NOx adsorber regeneration. The pre-cat, NOx adsorber regenerating aftertreatment system of the present invention may be used with any suitable control system.

2 Claims, 3 Drawing Sheets

PRECAT-NOX ADSORBER EXHAUST AFTERTREATMENT SYSTEM FOR INTERNAL COMBUSTION ENGINES

TECHNICAL FIELD OF THE INVENTION

The present invention generally relates to internal combustion engines and, more particularly, to a NOx adsorber aftertreatment system for internal combustion engines.

BACKGROUND OF THE INVENTION

As environmental concerns have led to increasingly strict regulation of engine emissions by governmental agencies, reduction of nitrogen-oxygen compounds (NOx) in exhaust emissions from internal combustion engines has become increasingly important. Current indications are that this trend will continue.

Future emission levels of diesel engines will have to be reduced in order to meet Environmental Protection Agency (EPA) regulated levels. In the past, the emission levels of US diesel engines have been regulated according to the EPA using the Federal Test Procedure (FTP) cycle, with a subset of more restrictive emission standards for California via the California Air Resources Board (CARB). For example, the Tier II emission standards, which are being considered for 2004, are 50% lower than the Tier I standards. Car and light truck emissions are measured over the FTP 75 test and expressed in gm/ml.

Regulatory agencies continue to propose and apply stricter emission standards. For example, proposed Ultra-Low Emissions Vehicle (ULEV) emission levels for light-duty vehicles up to model year 2004 are 0.2 gm/mi NOx and 0.08 gm/ml particulate matter (PM). Beginning with the 2004 model year, all light-duty Low Emission Vehicles (LEVs) and ULEVs in California would have to meet a 0.05 gm/ml NOx standard to be phased in over a three year period. In addition to the NOx standard, a full useful life PM standard of 0.01 gm/mi would also have to be met. The EPA has also proposed tighter regulations for off-road diesel engines, requiring them to emit 90% less particulate matter and nitrogen oxides, by 2014 than they do today.

Traditional methods of in-cylinder emission reduction techniques such as exhaust gas recirculation (EGR) and injection rate shaping, by themselves will not be able to achieve these low emission levels required by the standard. Aftertreatment technologies will have to be used, and will have to be further developed in order to meet the future low emission requirements of the diesel engine.

Some promising aftertreatment technologies to meet future NOx emission standards include lean NOx catalysts, Selective Catalytic Reduction (SCR) catalysts, and Plasma Assisted Catalytic Reduction (PACR). Current lean NOx catalyst technologies will result in the reduction of engine out NOx emissions in the range of 10 to 30 percent for typical conditions. Although a promising technology, SCR catalyst systems require an additional reducing agent (aqueous urea) that must be stored in a separate tank, which opens issues of effective temperature range of storage (to eliminate freezing) as well as distribution systems that must be constructed for practical use of this technology. PACR is similar to lean NOx in terms of reduction efficiency but is more expensive due to the required plasma generator. These technologies, therefore, have limitations that may prevent their use in achieving the new emissions requirements.

Therefore, there is a need for an engine aftertreatment system that provides a source of heat and reductants to regenerate NOx absorbents and does not result in a significant fuel penalty. The present invention is directed toward meeting this need.

SUMMARY OF THE INVENTION

One aspect the invention provides a NOx adsorber aftertreatment system for internal combustion engines, which utilizes a dedicated fuel injector and a precat directly upstream of a NOx adsorber/reducer to regenerate the NOx adsorber. Engine exhaust enriched in fuel is channeled through a precat formed from a suitable NOx oxidizer such as 50 g/ft$^3$ platinum on an alumina washcoat or a similar oxidation catalyst. The precat is positioned upstream of the NOx absorber. A dedicated fuel injector operatively linked to a fuel pump is used to inject fuel into the aftertreatment exhaust system upstream of the precat as needed to regenerate the NOx adsorber downstream from the precat. The precat catalyses the reaction of the injected hydrocarbon fuel and oxygen to produce exhaust gases enriched in reductants such as volatile hydrocarbons and carbon monoxide (CO), with a temperature in the range of, for example, 400 o 500° C. The reductants, and heat produced by the precat help to efficiently regenerate the NOx adsorber/reducer downstream of the precat.

Another aspect the invention provides an internal combustion engine exhaust gas aftertreatment system comprising a valve system having a valve input operatively coupled to the engine exhaust, a first valve system output, and a second valve system output. A fuel injector is provided with an input operatively coupled to a fuel pump and an injector output operatively coupled to the first valve system output. The fuel pump has an input operatively coupled to a fuel tank with an output operatively coupled to the fuel injector, and a precat having an input operatively coupled to the first valve output and a precat output. The precat is operatively coupled to a NOx adsorber such that the output of the precat is fed into the NOx adsorber. A controller, for example an engine controller, is operatively linked to the injector and fuel pump, such that the controller regulates the valve system, fuel injector, and fuel pump.

Another aspect the invention provides an internal engine exhaust gas aftertreatment system comprising a valve system having a valve input operatively coupled to an engine, a first valve output, a first precat having a precat input operatively coupled to the first valve output and a first precat output operatively coupled to a first NOx adsorber, a second precat having a second precat input operatively coupled to the second valve output and a second precat output operatively coupled to the input of a second NOx adsorber, a first injector operatively coupled to a fuel pump and to the first valve system output, and a second injector having a second injector input operatively coupled to the pump outlet and a second injector output operatively coupled to the second precat input. A fuel tank, for example the engine fuel tank, is operatively linked to the fuel pump and supplies fuel to the injectors. A controller, for example an engine controller, is operatively linked to the valve system, first injector, second injector, and fuel pump, such that the controller actuates the valve system, fuel injector, and fuel pump.

In another aspect, the invention provides a method of treating engine exhaust comprising, providing an exhaust aftertreatment system comprising: a valve system having a valve input operatively coupled to the engine exhaust, a first valve output, and a second valve output. A precat is provided having a precat input operatively coupled to the first valve output and a precat output and a NOx adsorber having an adsorber input operatively coupled to precat output and an adsorber output. A fuel tank is operatively coupled to fuel pump having a fuel pump intake operatively coupled to said fuel tank and a fuel pump outlet operatively coupled to the injector. The controller is operatively linked to the valve system, injectors, fuel pump, and it may also be linked to sensors in the exhaust system. The controller makes adjustments to the valve system to alter flow of exhaust to the precat operatively coupled to the NOx adsorbers to be regenerated. The controller may also activate the fuel pump and fuel injectors to make rich the exhaust gas entering the precat. The controller may also inactivate the fuel pump, igniter and adjust the valve system to increase flow of exhaust to at least partially regenerated NOx adsorber.

Still another aspect the invention provides a method for treating engine exhaust comprising: providing an exhaust aftertreatment system comprising: a valve system having a valve input operatively coupled to the engine exhaust, a first valve output, and a second valve output.

A precat is provided having a precat input operatively coupled to the first valve output and a precat output, a NOx adsorber having an adsorber input operatively coupled to said precat output and an adsorber output. A fuel tank is operatively coupled to a fuel pump having a fuel pump intake operatively coupled to said fuel tank and a fuel pump outlet a controller operatively linked to valve system, injector, fuel pump, and first and second NOx adsorbers. The controller adjusts the valve system to alter the flow of exhaust to the precat operatively coupled to the NOx adsorber undergoing regeneration. The controller also activates the fuel pump providing fuel to the injector, feeding fuel into the exhaust stream of the precat upstream of the NOx adsorber being regenerated. The controller monitors input from the lambda sensor and inactivates the fuel pump and adjusts the valve system to increase flow of exhaust gas to the at least partially regenerated NOx adsorber.

In one aspect of the invention, the valve system used in the exhaust aftertreatment system may be either a proportional 3-way valve or a pair of 2-way valves. The valves may be of a kind that open and close by discrete amounts or valves that are continuously variable in their output.

In one aspect the invention, the aftertreatment systems includes a temperature and lambda sensor and/or a NOx sensor operatively coupled to the valve system output, and/or NOx adsorber output(s) that relays information to the system controller.

In another aspect of the invention, the aftertreatment system includes a catalytic soot filter with an input operatively coupled to the output of at least one NOx adsorber.

In still another aspect of the invention, the aftertreatment system includes an igniter operatively coupled to the input of the valve system and operatively linked to the controller. The igniter may be energized every time fuel is injected into the aftertreatment system or it may be energized only when exhaust gas temperature is deemed too low to ignite the fuel in the exhaust gas.

In one aspect of the invention, the aftertreatment system is operated under a closed control system. Under closed control operation information from sensor within the system is processed by the controller and based on the this information, and programmed standards for NOx adsorber performance, the controller determines when to activate and inactivate the components of the system designed to regenerate NOx adsorbers in the system.

In another aspect of the invention, the aftertreatment system is operated in an open control system. In an open control system the controller activates and inactives the NOx regeneration system based upon stored engine run parameters such as time, fuel usage, engine speed, and the like. Sensor input such as level of NOx supplied by optional NOx sensors is not necessary to the operation of an open control system.

DETAIL DESCRIPTION OF THE PREFERRED EMBODIMENTS

Figure 1:
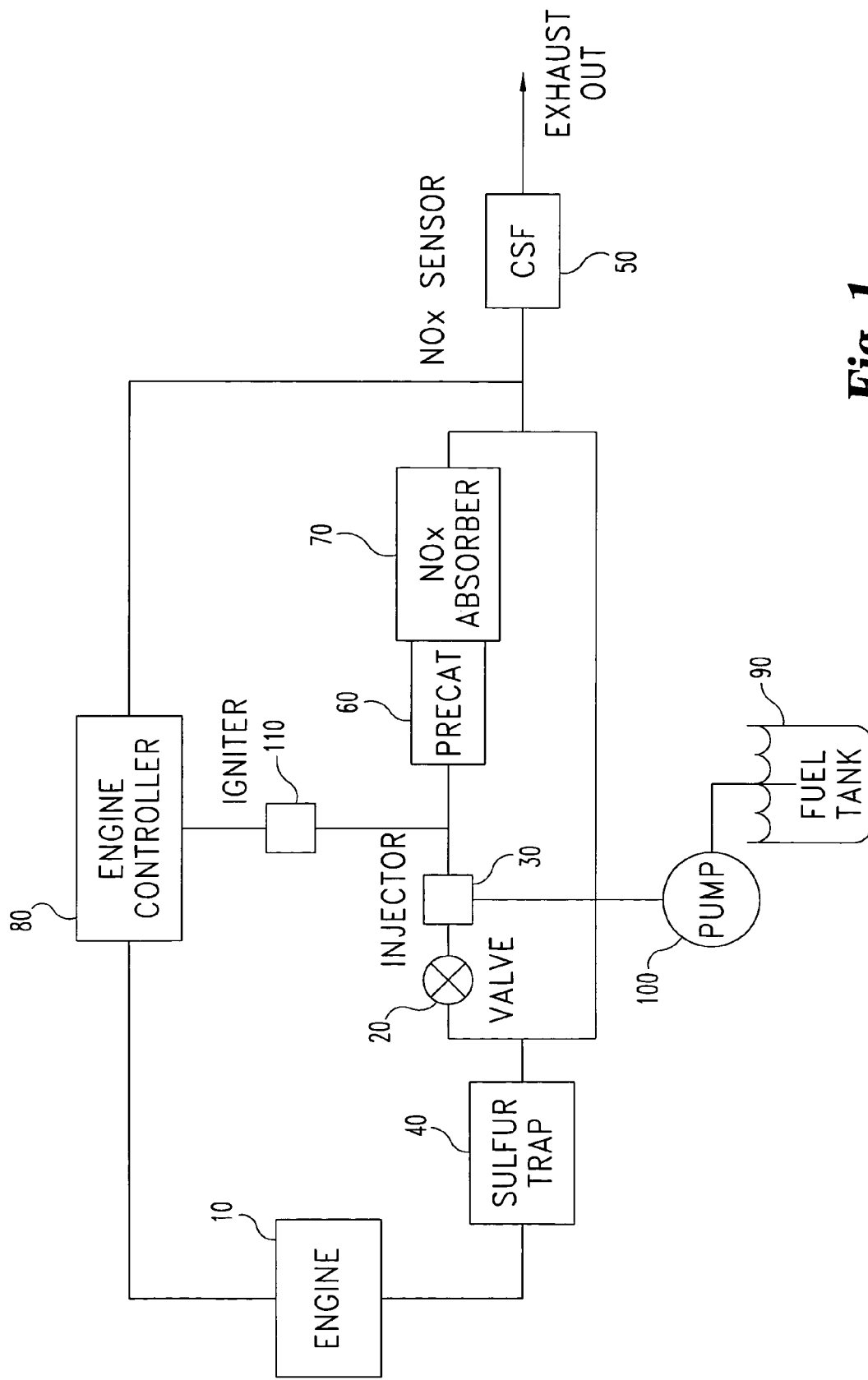
FIG. 1 is a schematic block diagram of a first preferred embodiment system of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

NOx adsorber catalysts have the potential for great NOx emission reduction (60-90%) and the NOx adsorber is one of the most promising NOx reduction technologies. During lean-burn operation of the engine, the trap adsorbs nitrogen oxide in the form of stable nitrates. Commonly used NOx absorbers are comprised of, for example, precious metals such as platinum, rhodium, and at least one alkali metal, as for example potassium, sodium, lithium, and cesium; alkali-earth metals such as barium and calcium; and rare earth metals such as lanthanum and yttrium. NOx absorbers operate by sequestering nitrogen oxides under lean conditions and then releasing $N_2$ under rich conditions.

NOx absorbers that may be used to practice the invention include for example, a precious metal catalyst such as platinum, and a NOx absorbent such as barium oxide and are thought to operate as follows. Under lean conditions (when the concentration of $O_2$ in the exhaust gas is relatively high) oxygen is deposited on the surface of platinum in the form of $O_2^-$ or $O^{2-}$ and reacts with NO in the exhaust by the reaction $2NO+O_2 \rightarrow 2NO_2$. $NO_2$ is further oxidized on the surface of the platinum to form $NO_3$ (nitric acid ions) and Nitric acid ions bind to the barium oxide component of the adsorber to form, for example, $BaNO_3$.

Sulfur and sulfur containing molecules in the exhaust also react with precious metal catalysts such as platinum and sulfur oxides can also form complexes with absorbents such as barium oxide. Sulfur complexes formed between metal catalysts and NOx absorbents are generally more thermodynamically stable than similar complexes formed with NOx. Sulfurous compounds in the exhaust may poison precious metal catalysts; and they may not be as readily released from NOx absorbents as is NOx under various absorbent regeneration schemes.

Under rich (stoichiometric conditions), when the concentration of oxygen in the exhaust gas is relatively low the reaction to form nitric acid ions ($NO_3 \rightarrow NO_2$) is reversed and NOx in the form of $NO_2$ is released from the absorbent. In the presence of precious metal catalyst such as platinum, $NO_2$ may react with reductants such as CO and HC to form $N_2$.

Similarly, albeit often under harsher conditions, SOx may also react with reductants under rich conditions to form elemental sulfur.

In general the reduction of NOx and SOx compounds by hydrocarbons, carbon dioxide, and other reductants catalyzed by precious metals such as platinum, proceeds more efficiently as the temperature is increased. However, widely used NOx absorbers such as barium oxide (BaO) operate less efficiently at elevated temperatures, for example $Ba(NO_3)_2$ is more stable at 200° C. than at 500° C. Therefore, if exhaust temperatures are too high under lean conditions, the adsorber may fail to efficiently sequester NOx, and if the reaction temperatures are too low, even under rich conditions, the regeneration of the adsorber may be inefficient.

One approach to optimize both adsorber binding of nitrogen oxides and the regeneration of NOx absorbers to release essentially $N_2$ has been to periodically introduce excess hydrocarbons into the engine in the form of excess engine fuel. The introduction of fuel into the engine produces rich exhaust gases, that provides a source of reductants such as HC and CO for the regeneration of the NOx absorber. However, as the exhaust gas is voluminous and only a relatively small amount of hydrocarbon present under rich conditions and elevated temperatures is necessary to regenerate the NOx absorbers, injecting fuel directly into the engine may result in a significant fuel penalty.

The method of periodically introducing excess hydrocarbon into an internal combustion engine in order to generate reductants for recycling or regeneration of NOx absorbers and catalytic soot filters is particularly problematic for light-duty engines. Light-duty engines typically have operating temperatures in the range of 150 to 250° C., which is lower than the optimal temperatures required for the regeneration of NOx absorbers and catalytic soot filters. As precats provide both a source of reductant and heat necessary for the regeneration of NOx adsorbers, catalytic soot filters, and the like irrespective of the operating temperature of the engine, precats are particularly useful when operatively positioned within the in the exhaust gas aftertreatment systems of light-duty internal combustion engines.

One embodiment of the invention is an exhaust aftertreatment system comprising a dedicated fuel supply, a precat, a NOx adsorber for sequestering NOx produced by internal combustion engines, and if necessary or desirous other components for the reduction of SOx, soot, and volatile hydrocarbons from internal combustion engine exhaust.

Referring now to FIG. 1, there is illustrated a schematic block diagram of a first preferred embodiment of the present invention. The system is designed to remove NOx compounds from the exhaust stream of an internal combustion engine 10, and to efficiently regenerate the NOx adsorber 70 used in the system. Engine exhaust produced by engine 10 exits the exhaust manifold of the engine and is passed through operatively positioned sulfur trap 40. Exhaust gas output from sulfur trap 40, passes by an optional operatively positioned NOx sensor (not shown); and injector 30 before it is input into exhaust control valve 20. The optional NOx sensor relays data about, for example, NOx, exhaust gas temperature, and the ratio of air to fuel (A/F) lambda in the exhaust gas to engine controller 80. In one embodiment of the invention, engine controller 80 is also operatively linked to a second NOx sensor 140, operatively positioned in the exhaust gas stream output of NOx adsorber 70.

Engine controller 80 is operatively linked to exhaust control valve 20, and opens valve 20 to regulate exhaust gas flow to precat 60 and NOx adsorber 70. In one embodiment of the invention control valve 20 shunts a portion of the exhaust gas past the section of the exhaust system comprising the NOx adsorber being regenerated. Fuel injector 30, located in the exhaust stream upstream of the precat 60, is operatively linked to engine controller 80 and connected to fuel tank 90 through pump 100. Valve 20 is operatively controlled by engine controller 80, and closed or opened to change the amount of exhaust gas that flows through the NOx adsorber 70. Engine controller 80 opens injector 30 and activates pump 100 to feed fuel from tank 90 into precat 60 to create rich (stoichiometric) conditions within the exhaust gas aftertreatment system. Engine controller 80 energizes igniter 10 operatively positioned within the exhaust gas aftertreatment system 30 and before the input to precat 60 to ignite fuel in the exhaust gas when the temperature of the exhaust gas is too low to ignite the fuel.

Fuel delivered by injector 30, is introduced along with exhaust gas into the input of precat 60 where it may further oxidize to produce heat, and an exhaust stream enriched in volatile hydrocarbon, $NO_2$, CO, HC and $H_2O$. Precat 60 is operatively positioned upstream from NOx adsorber 70 such that exhaust output from precat 60 is fed into the input of NOx adsorber 70. The combination of decreased exhaust gas flow, and direct injection of fuel into the exhaust stream serves to enrich the exhaust gas in hydrocarbon while incurring a reduced fuel penalty associated with enriching the exhaust with hydrocarbon. The exhaust stream from precat 60 flows into NOx adsorber 70 where the additional heat, volatile hydrocarbons, CO, $H_2O$, and $NO_2$ produced by the fuel injected into precat 60 increases the rate of NOx adsorber 70 regeneration. All exhaust is input into catalytic soot filer 50 before it is output from the system.

In one embodiment of the invention, SOx, trap 40 is operatively positioned upstream from precat 60 such that the output of the 40 is fed into the input of 60. Engine fuel and lubrication oil contain sulfur and therefore, sulfur-oxygen compounds (SOx) are formed during the combustion cycle and are present in the exhaust gas. Most commonly used precious metals, for example platinum, used as catalysts in exhaust gas aftertreatment systems form stable complexes with sulfur and sulfur-containing molecules that reduce the catalytic effectiveness of the metal. Additionally, many commonly used NOx adsorbents, such as barium oxide (BaO) absorb SOx and as BO—SOx complexes are thermodynamically more stable than BO—NOx complexes, SOxs are not as readily removed from most commonly used NOx adsorbents as are NOxs during NOx adsorber regeneration. Under normal engine exhaust operating temperatures, SOx reaching the NOx adsorber tends to accumulate in the NOx adsorber, reducing the ability of the adsorber to trap NOx. The optional sulfur trap 40 may, therefore, be used to trap SOx containing compounds before they reach components of the aftertreatment system that may react unfavorably with sulfur and sulfur-containing molecules.

Figure 2:
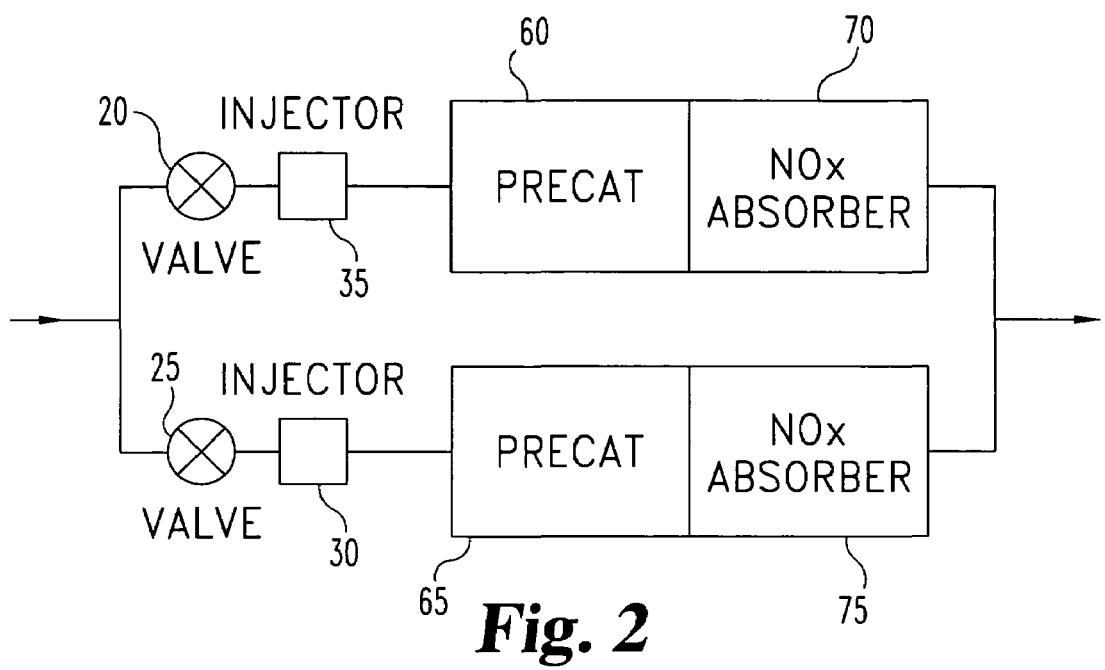
FIG. 2 is a schematic block diagram of a second preferred embodiment system of the present invention.

Referring now to FIG. 2, there is illustrated a second preferred embodiment of the present invention. The second embodiment of the present invention is similar to the first embodiment illustrated in FIG. 1, and like reference designators refer to like components. In the second embodiment, the 2-way valve 20 and bypass pathway are replaced with a pair of 2-way valves 20 and 25. Valve 20 controls the flow of exhaust gases into precat 60, while valve 25 controls the flow of exhaust gases into precat 65. Each of the valves 20, 25 is coupled to the engine controller 80 for control thereby. The injectors 30, 35 may be located downstream (as shown) or upstream of the valves 20 and 25.

Figure 3:
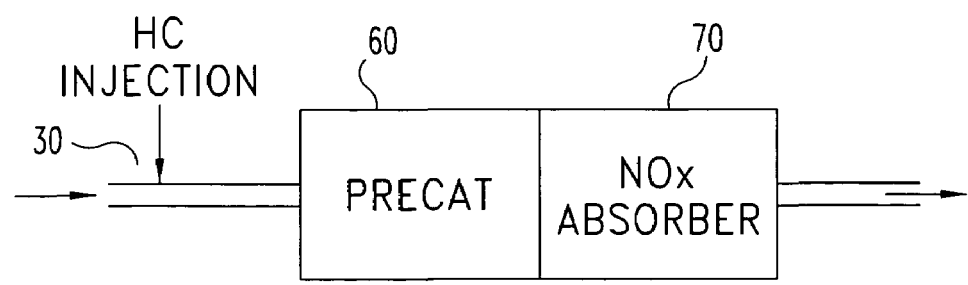
FIG. 3 is a schematic block diagram of a third preferred embodiment system.

In one embodiment of the invention, a proportional control 3-way valve controls the flow of exhaust gas leaving sulfur trap 40 to each of two sets of precats 60, 65 and NOx absorbers 70, 75. As is known in the art, a proportional control 3-way valve may be used to divide the flow of a gas stream into two separate paths, wherein the percentage of the total gas flow being directed to either path is controllable. In the embodiment of FIGS. 1, 2 and 3 when practiced with a proportional control 3-way valve, the valve is coupled to the engine controller in order to control the relative proportions of exhaust gas flow routed to either output of the valve.

In one preferred embodiment of the invention, the exhaust gas aftertreatment system can be operated in full bypass mode. Exhaust gas aftertreatment systems that can be operated in full bypass mode may be comprised of at least two sets (legs) of precats and NOx absorbers. Referring still to FIG. 2, there is illustrated a schematic block diagram of one preferred embodiment of the present invention designed for operation in Full Bypass mode. In one leg of the system, precat 60 is operatively positioned upstream of NOx adsorber 70 such that the output of precat 60 is input into adsorber 70. While in a parallel leg, precat 65 is operatively positioned upstream of NOx adsorber 75 such that the output of precat 65 is input into adsorber 75. As required to maintain both NOx adsorbers 70 and 75 within their working limits for the adsorption of NOx, the flow of rich (stoichiometric) exhaust gas to each leg is adjusted.

Exhaust gas flow through valves 20 and 25 are adjusted to control the flow of exhaust flow to the NOx adsorber (either 70 or 75) undergoing regeneration. While, exhaust flow is reduced to the leg undergoing regeneration, the controller actuates pump 100 to provide fuel to the respective injector 30, 35, for introduction into the exhaust gas stream. The controller adjusts exhaust gas flow and fuel injection so as to produce a rich (stoichiometric) exhaust gas mixture which is fed into the input of the precat 60 or 65 located in the leg of the system undergoing NOx adsorber 70 or 75 regeneration. Fuel in the rich exhaust gas is partially oxidized in precat 60 or 65 and to produce heat, and reductants such as HC, CO, $NO_2$, which are output from the precat and into the input of operatively positioned NOx adsorber 70 or 75. The combination of heat and reductants input into NOx adsorber 70 or 75 contributes to the efficient regeneration of NOx adsorber 70 or 75. When exhaust gas aftertreatment systems are operating in the full bypass mode, as one NOx adsorber (for example 75) is being regenerated, the other NOx adsorber (for example 70) is operating to adsorb NOx from engine 10 exhaust.

In most exhaust gas aftertreatment systems, the readiest source of hydrocarbons for use as reductants and as a means of producing heat for the regeneration of NOx adsorber is the engine's own fuel supply. For example, the hydrocarbon used to regenerate a NOx adsorber operating in conjunction with a diesel engine could be diesel fuel. In one embodiment of invention, fuel for NOx adsorber regeneration is drawn from fuel tank 90 by dedicated pump 100 and introduced into the aftertreatment exhaust by injector 30. Fuel pump 100 may be of any type suitable for the delivery of the fuel used, including for example a low cost diaphragm pump. Injector 30 can be of any type suitable for the injection of the type of fuel used and need not necessarily be designed for use in the face of high head pressures. Optional igniter 110 is present to ensure that any fuel in the exhaust aftertreatment is volatilized before it reaches the precat. The igniter is especially important under cold start conditions, and under any circumstances wherein the temperature of the exhaust gas is too low to ignite, or volatize, the fuel introduced into the exhaust aftertreatment system. It will also be understood that the precat will also catalyze the reaction of most hydrocarbons, including for example diesel fuel, and oxidizers in the exhaust stream thereby obviating, or at least reducing, the need for a dedicated igniter in the exhaust aftertreatment system.

Precats, suitable for the practice of this invention include, for example, 50 g/ft$^3$ platinum on an aluminum wash-coat or other suitable oxidation catalyst. NOx adsorber/regenerators suitable for the practice of this invention include, for example, precious metals such as platinum, rhodium, and at least one alkali metal, as for example potassium, sodium, lithium, and cesium; alkali-earth metals such as barium and calcium; and rare earth metals such as lanthanum and yttrium. Soot filter 50 can be of the type with, or without, a catalytic component in place to oxidize soot accumulated under lean conditions and burned off to $H_2O$ and $CO_2$ when the exhaust is rich (i.e. is stoichiometric in hydrocarbon content).

In one embodiment of the invention, engine controller 80, based on predetermined time settings, engine run parameters, measured levels of NOx or any combination of these criteria, regulates exhaust gas flow through the exhaust system and controls the injection of fuel into the exhaust stream.

The valves 20 and 25 may comprise either variable flow rate control valves or may comprise valves having a fixed number of flow rate settings. For example, if the aftertreatment system design dictates that the relative flow between NOx adsorbers 70, 75 will always be 20-80 during regeneration, then the valves 20, 25 may have discrete settings that will allow the engine controller 80 to switch them between reduced flow (20%) and max flow (80%) settings in order to achieve the desired flow reduction in one of the precats 60, 65. Optionally, the valves 20, 25 may have variably adjustable flow rates, such that the engine controller 80 can infinitely adjust the flow percentage through each valve 20, 25 in order to divide the exhaust flow between precat 60, 65 in any desired proportion.

The engine controller 80 receives data indicative of engine performance, and exhaust gas composition including but not limited to engine sensor data, such as engine position sensor data, speed sensor data, air mass flow sensor data, fuel rate data, etc., as is known in the art. The engine controller 80 may further provide data to the engine in order to control the operating state of the engine, and components of the aftertreatment system, as is well known in the art.

When used with an exhaust aftertreatment system designed for operation in full bypass mode the two outputs of the 3-way valve are coupled to the respective inputs of a pair of precats 60 and 65 operatively positioned upstream of a pair NOx adsorbers (catalytic converters) 70 and 75. Therefore, by providing control signals from the engine controller 80 to the proportional control 3-way valve, the percentage of the total exhaust flow from the engine 10 entering either the precat 60 or 65 may be precisely controlled. A fuel injector 30 is positioned to inject a measured quantity of fuel (hydrocarbon) into the exhaust gas flow entering the precat 60. Similarly, a second fuel injector 35 is positioned to inject a quantity of fuel into the exhaust gas flow entering precat 65. Both injectors 30, 35 are controlled by the engine controller 80 and are supplied with fuel from a pump 100 supplied by the vehicle fuel tank 90. Preferably, the fuel pump 100 is a low-cost diaphragm-type fuel pump. At least one igniter 110 is preferably provided to ignite the fuel being injected by the injectors 30, 35 under the control of the engine controller 80.

Because the exhaust flow is reduced in the adsorber leg being regenerated, the amount of reductant required to create a rich (stoichiometric) exhaust gas is reduced. The concentration of reductant required for reduction remains the same, but this amount is a small fraction of the total reductant during full exhaust flow. It will be appreciated that any flow ratios may be utilized during reduction and regeneration and during normal flow, even though exemplary flows are used herein for illustrative purposes. The optimum flow ratios for any given system will depend upon the particular system configuration.

As detailed hereinabove for a parallel dual adsorber system, the adsorber regeneration cycle switches back and forth between the two sides of the exhaust as necessary in order to keep the outlet exhaust stream purified of excessive emissions. It will be appreciated that since dual exhaust streams are utilized, the regeneration cycle of the NOx adsorber does not necessarily have to be short. During the entire time that one adsorber is being regenerated, the other adsorber is available for treating the majority of the exhaust gas stream. It should also be noted, that the temperature of the regeneration exhaust gas stream may be controlled by adjustment of the proportional control 3-way valve in conjunction with the igniter 110. By allowing slightly more exhaust gas to pass into the regeneration side of the exhaust, the temperature thereof may be raised.

One advantage of the Full Bypass system is that since the exhaust flow is reduced in the leg undergoing NOx adsorber regeneration, only a fraction of the amount of hydrocarbon that would have been required to make the mixture rich during full flow is now required. The result is a substantial reduction in the fuel penalty incurred for regeneration of the NOx adsorber catalyst. Once a leg has been regenerated, the flow distribution between the parallel legs may be reversed, and the other catalyst leg regenerated while the newly regenerated leg receives the majority of the exhaust flow. Another advantage of the present invention is that since NOx is being stored in one leg while the other leg is being regenerated, the regeneration operation can be performed for a longer period of time, resulting in greater regeneration efficiency.

Referring now to FIG. 3, there is illustrated a schematic block diagram of one preferred embodiment of the present invention designed for operation in full flow mode. In this embodiment of the invention, the flow of exhaust gas through NOx adsorber 70 is not diverted during regeneration of the NOx absorber. Fuel is injected into precat 60, where it is at least partially oxidized to produce volatile hydrocarbons, CO, $H_2O$, NO, $NO_2$, and heat that is transferred downstream to the adsorber 70. Exhaust gas with a temperature of about 300 C. as well as an exhaust stream enriched in $NO_2$, HC and CO flows downstream into NOx adsorber 70. The combination of rich conditions which serves to release NOx from the absorbent, and elevated temperatures and HC, $NO_2$ and CO react with NOx released from the absorbent in the presence of for example the precious metal platinum to produce $N_2$ and to regenerate adsorber 70.

In one preferred embodiment of the invention, fuel is injected into the exhaust gas when the engine duty cycle is such that relatively little exhaust gas is being produced by the engine. This enables the exhaust to be enriched in fuel while incurring a relatively low fuel penalty as the volume of exhaust gas is relatively reduced.

One advantage of the Full Flow exhaust aftertreatment system is that hydrocarbon (for example diesel fuel) is injected into the exhaust stream only as needed to regenerate the NOx adsorber. Thus, the engine can be operated under lean conditions as dictated by other concerns such as fuel economy, and excess fuel to regenerate NOx adsorbers is used only as necessary for NOx adsorber regeneration.

In one embodiment of the invention, the exhaust aftertreatment system is provided with a carbon soot filter to trap diesel soot particulate matter by physical filtering. The catalytic soot filter also acts as an oxidation catalyst by the addition of precious metal catalysts which reduce the volatile organic fraction of the soot material by the catalyzed oxidation reaction (e.g. C+Oxidant→CO).

The exhaust gases exiting the carbon soot filter (CFS) 50 may then exit the vehicle. An optional NOx sensor 140 may be placed between the NOx adsorbers 70, 75 and CFS 50 in order to directly measure the level of NOx in the exhaust gas leaving NOx adsorbers 70 and 75. The output of the optional NOx sensor 140 is provided to the engine controller 80. The exhaust gases exiting the adsorbers 70 and 75 are combined together before being input into optional additional exhaust gas aftertreatment components such as a carbon soot filter 50. The combination of precats 60, 65 upstream of NOx absorbers 70, 75 make it unlikely that any of the fuel injected into the exhaust gas aftertreatment system to create rich conditions for catalyst and NOx adsorber regeneration will escape from the tailpipe of the system. In any event, a hydrocarbon oxidation catalyst (for example the use of a diesel oxidation catalyst) can be positioned downstream of the adsorbers 70, 75 to virtually eliminate hydrocarbon emission from the tailpipe. Such oxidation catalysts contain precious metals in them that reduce the activation energy of hydrocarbon combustion, such that the unburned hydrocarbon is oxidized to carbon dioxide and water.

Figure 4:
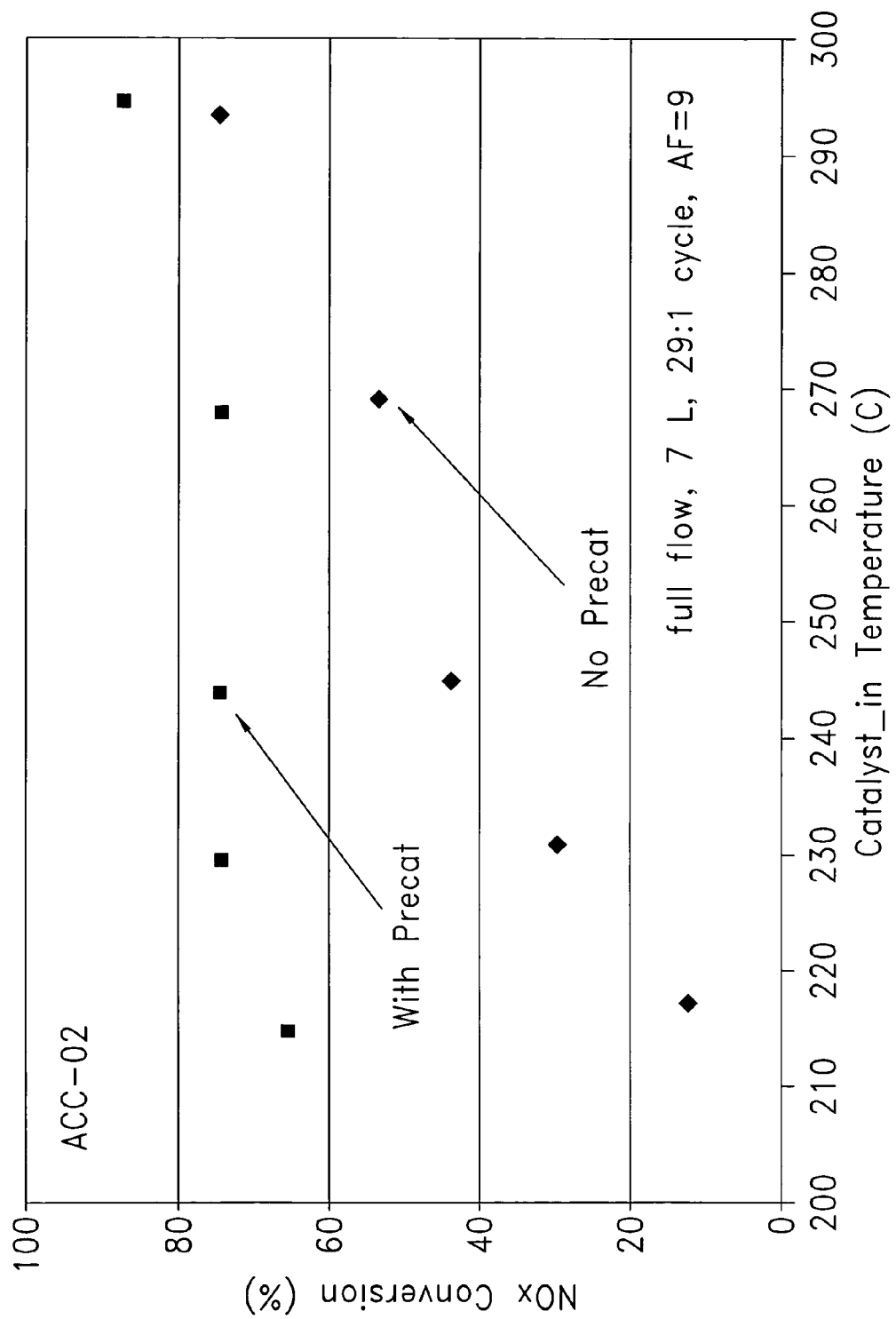
FIG. 4 is graph of data illustrating the effect of a precat on catalyst operating temperature and the conversion of NOx to $N_2$.

Referring now to FIG. 4, a graph of the percent of NOx converted (reduced) to $N_2$ measured as a function of temperature is illustrated. NOx conversion by the NOx reducer was measured with and without a precat upstream of the NOx reducer. The introduction of exhaust gas rich in hydrocarbon into the precat produces heat, volatile hydrocarbons, CO, $H_2O$ and NOx reacts on the precious metal catalyst of the NOx absorber, with, for example CO, to produce $N_2$ and $CO_2$. As can be seen in FIG. 4, $NO_x$ conversion efficiency improves dramatically when the precat is positioned upstream of the absorber.

While the invention was largely illustrated with a sulfur trap operatively positioned upstream of the exhaust gas fuel injectors and precats (FIG. 1) and a carbon soot filter operatively positioned downstream from the NOx absorbers (FIG. 1), it should be understood that the invention can be practiced with any combination, arrangement, or absence of, exhaust aftertreatment components, such as sulfur traps, carbon soot filters, and fuel oxidation catalysts and the like.

Therefore, the system illustrated and described herein is effective in addressing all legislatively-controlled emissions including NOx, SOx and hydrocarbons. NOx adsorbers are used for reduction of NOx levels and are more easily regenerated in this aftertreatment system than in prior art systems due to the presence of precats and a system for directly injecting hydrocarbons into the exhaust aftertreatment system. Operative positioning of precats, such that rich fuel mixtures are input into the precat and exhaust enriched in heat, and reductants are output from the precats into the NOx adsorber. The sulfur trap removes sulfur from the exhaust, making the operation of the adsorber more efficient and longer lasting. The catalytic soot filter traps particulate soot from the exhaust stream. Finally, an diesel oxidation catalyst cleans up any leftover hydrocarbons exiting the adsorbers, thereby allowing the exhaust emitted by the system of the present invention to meet or exceed the requirements of the various legislative bodies.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. And while the invention was illustrated using specific examples, and premised on certain theoretical or idealized accounts of catalysis behavior, these illustrations and the accompanying discussion should by no means be interpreted as limiting the invention.

We claim:

1. A method of treating engine exhaust comprising:
   providing an exhaust aftertreatment system comprising:
   a valve system having a valve input operatively coupled to the engine exhaust, a first valve output, and a second valve output;
   a precat having a precat input operatively coupled to the said first valve output and a precat output;
   a NOx adsorber having an adsorber input operatively coupled to said precat output and an adsorber output;
   a fuel tank operatively coupled to a fuel pump; and
   the fuel pump having a fuel pump intake operatively coupled to said fuel tank and a fuel pump outlet;
   at least one first NOx sensor operatively coupled to said valve system output;
   at least one second NOx sensor operatively coupled to said NOx adsorber output;
   a soot filter having a soot filter input operatively coupled to coupled to the first NOx adsorber output;
   a NOx sensor positioned intermediate the first NOx adsorber output and the soot filter;
   a controller operatively linked to said valve system, said injector, and said fuel pump, said first and second NOx sensors;
   collecting data on NOx levels from said first NOx sensor and said second NOx sensor;
   sending data from said NOx sensors to said controller;
   processing said data from said NOx sensors in said controller;
   adjusting said valve system to alter flow of exhaust to said precat operatively coupled to said NOx adsorber undergoing regeneration based on signals from said controller;
   activating said fuel pump based on signals from said controller;
   pumping fuel to said injector;
   injecting fuel into the input of said precat;
   monitoring input from said NOx sensors measuring the level of NOx in exhaust;
   inactivating said fuel pump by said controller; and
   adjusting said valve system to increase flow of exhaust to at least partially regenerated NOx adsorber.

2. A method of treating engine exhaust comprising:
   providing an exhaust aftertreatment system comprising:
   a valve system having a valve input operatively coupled to the engine exhaust, a first valve output, and a second valve output;
   a precat having a precat input operatively coupled to the said first valve output and a precat output;
   a NOx adsorber having an adsorber input operatively coupled to said precat output and an adsorber output;
   a fuel tank operatively coupled to a fuel pump; and
   the fuel pump having a fuel pump intake operatively coupled to said fuel tank and a fuel pump outlet;
   a lambda sensor operatively coupled to said valve system output;
   a bypass flowpath flow coupling the second valve system output and a location downstream from the NOx adsorber, wherein no NOx adsorber is present in the bypass flow path;
   a controller operatively linked to said valve system, said injector, and said fuel pump, said first and second NOx adsorbers;
   collecting data on NOx levels from said lambda sensor;
   sending data from said lambda sensor in said controller;
   processing said data from said lambda sensor in said controller;
   adjusting said valve system to alter flow of exhaust to said precat operatively coupled to said NOx adsorber undergoing regeneration in response to signals from said controller;
   activating said fuel pump in response to signals from said controller;
   pumping fuel to said injector;
   injecting fuel into the input of said precat;
   monitoring input from said lambda sensor;
   inactivating said fuel pump by said controller; and
   adjusting said valve system to increase flow of exhaust to at least partially regenerated NOx adsorber.

* * * * *